United States Patent
Behrens

(10) Patent No.: US 11,542,391 B2
(45) Date of Patent: *Jan. 3, 2023

(54) HARDENER COMPONENT FOR MULTI-COMPONENT EPOXY RESIN MATERIAL, AND MULTI-COMPONENT EPOXY RESIN MATERIAL

(71) Applicant: Hilti Aktiengesellschaft, Schaan (LI)

(72) Inventor: Nicole Behrens, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 83 days.

This patent is subject to a terminal disclaimer.

(21) Appl. No.: 15/733,090

(22) PCT Filed: Nov. 13, 2018

(86) PCT No.: PCT/EP2018/081098
§ 371 (c)(1),
(2) Date: May 14, 2020

(87) PCT Pub. No.: WO2019/115110
PCT Pub. Date: Jun. 20, 2019

(65) Prior Publication Data
US 2020/0362161 A1 Nov. 19, 2020

(30) Foreign Application Priority Data
Dec. 15, 2017 (EP) .................... 17207545

(51) Int. Cl.
*C08L 63/00* (2006.01)
*C08K 5/17* (2006.01)

(52) U.S. Cl.
CPC ............... *C08L 63/00* (2013.01); *C08K 5/17* (2013.01)

(58) Field of Classification Search
CPC .................................. C08L 63/00; C08K 5/17
USPC .......................................................... 523/427
See application file for complete search history.

(56) References Cited

U.S. PATENT DOCUMENTS

| | | |
|---|---|---|
| 9,156,946 B2 | 10/2015 | Gorodisher |
| 9,695,273 B2 | 7/2017 | Gorodisher et al. |
| 2014/0221601 A1 | 8/2014 | Gorodisher |
| 2015/0045528 A1 | 2/2015 | Gorodisher et al. |
| 2016/0159690 A1 | 6/2016 | Dureault et al. |

FOREIGN PATENT DOCUMENTS

| | | |
|---|---|---|
| EP | 2 826 796 | 1/2015 |
| WO | 2013/048851 | 4/2013 |
| WO | 2013/063236 | 5/2013 |

OTHER PUBLICATIONS

International Search Report dated Feb. 11, 2019 in PCT/EP2018/081098 with English translation, 5 pages.
Written Opinion dated Feb. 11, 2019 in PCT/EP2018/081098.

*Primary Examiner* — David T Karst
(74) *Attorney, Agent, or Firm* — Grüneberg and Myers, PLLC

(57) ABSTRACT

A hardener component is useful for a multi-component epoxy resin material, and includes a benzoxazine amine adduct as an accelerator and an amine as a hardener. The benzoxazine amine adduct is present in the hardener component in a proportion of from 8.5 wt. % to 75 wt. %. The multi-component material including the benzoxazine amine adduct in the hardener component already has a quick curing time at room temperature and can therefore be used advantageously for the chemical fastening of construction elements.

20 Claims, No Drawings

HARDENER COMPONENT FOR MULTI-COMPONENT EPOXY RESIN MATERIAL, AND MULTI-COMPONENT EPOXY RESIN MATERIAL

CROSS-REFERENCE TO RELATED APPLICATIONS

This application is a National Stage entry under § 371 of International Application No. PCT/EP2018/081098, filed on Nov. 13, 2018, and which claims the benefit of European Application No. 17207545.9, filed on Dec. 15, 2017, the contents of each of which are hereby incorporated by reference in their entireties.

BACKGROUND OF THE INVENTION

Field of the Invention

The invention relates to a hardener component for a multi-component epoxy resin material for the chemical fastening of construction elements, and to a multi-component epoxy resin material. The invention also relates to the use of a benzoxazine amine adduct as an accelerator in a hardener component for a multi-component epoxy resin material.

Discussion of the Background

Multi-component mortar compositions based on hardenable epoxy resins and amine hardeners have been known for some time and are used as adhesives, spackling pastes for repairing cracks and chemical anchors for fastening construction elements such as anchor rods, reinforcing bars and screws in boreholes in various substrates. For use on outdoor construction sites, the mortar compositions have to be easy to handle even at low temperatures, and should only have low creep at elevated temperatures. At the same time, however, the mortar compositions should have a long processing time and should cure quickly and completely in a wide temperature range, and the cured mortar compositions should reach high load values even with wet boreholes and low temperatures and should have good heat resistance.

These property profiles, some of which are contradictory, cannot be easily met. With conventional mortar compositions, it is customary to provide a high proportion of low-viscosity constituents, a low filler proportion and coarse fillers in order to achieve good handling behavior at low temperatures, although this is disadvantageous in terms of low creep behavior under a load at elevated temperatures. Conversely, a long processing time is achieved as a result of a high proportion of non-reactive or non-crosslinking diluents and less reactive components, and this prevents a short curing time.

Mortar compositions based on epoxy amine also have slow curing kinetics, an extended pot life or gel time, and usually low heat resistance and creep resistance. This means that they can be handled easily and reach good load values only in a narrow temperature range. The curing time of mortar compositions based on epoxy amine is generally set by selecting an appropriate amine and/or by adding catalysts such as tertiary amines, alcohols and acids.

EP 014 99 89 A2 describes an aqueous dispersion of benzoxazine and protonated amine. The dispersions can be dried and hardened so as to produce surface coatings and primers. The mixture of benzoxazine and amine is hardened at 135° C.

WO 2013/063236 A1 describes a multi-component system, in particular for coatings, which consists of benzoxazine, amine and epoxide and which cures at elevated temperatures of approximately 100° C. Benzoxazine amine epoxy adducts and benzoxazine amine adducts are put forward as possible intermediate products.

WO 2013/048851 A1 describes oligomers and polymers from the reaction of benzoxazine and a mixture of amine and thiol. A curable composition of benzoxazine, thiol and amine is disclosed, the hardening temperature being at least 100° C.

The disadvantage of the epoxy systems known from the prior art, in which benzoxazines are used, is their slow curing time at room temperature. This makes these systems unsuitable for chemical fastening, in particular for anchoring fastening means in boreholes as chemical anchors. Increasing the temperature to above 80° C. is impractical for applications, especially outdoors. In particular, the mixtures known from the prior art, which consist of a benzoxazine, amine and epoxy component, therefore cure too slowly for use on construction sites and are therefore unsuitable.

Other substances such as tertiary amines, alcohols, acids and novolac resins, which can be used as accelerators, have an influence on the formulation of the epoxy resin material due to the amount added and their properties. A change in the proportions of components in the mortar composition usually results, however, in significant changes in the final properties of the cured mortar composition. In particular, changes in the load values of the cured mortar can often be observed in this case.

SUMMARY OF THE INVENTION

The problem addressed by the invention is therefore that of providing a hardener component for epoxy systems which allows a multi-component epoxy material to be cured at low temperatures within a time period that is acceptable in the construction sector. At the same time, however, a sufficient processing time should be maintained.

The problem addressed by the invention is solved by a hardener component according to a preferred embodiment. Further preferred embodiments of the hardener component according to the invention are provided below, which may optionally be combined with one another.

The invention further relates to a multi-component epoxy resin material according to another preferred embodiment. Further preferred embodiments of the epoxy resin material according to the invention are provided below, which may optionally be combined with one another.

The invention also covers the use of a multi-component epoxy resin material for chemical fastening according to yet another preferred embodiment, and the use of a benzoxazine amine adduct as an accelerator in a hardener component for the epoxy resin material.

DETAILED DESCRIPTION OF THE INVENTION

According to the invention, the hardener component (B) for a multi-component epoxy resin material for the chemical fastening of construction elements comprises a benzoxazine amine adduct, the benzoxazine amine adduct being selected from the group consisting of substances according to formula Ia, substances according to formula Ib and mixtures thereof, having the following structures:

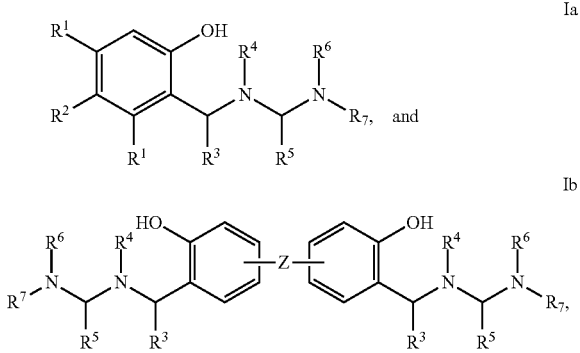

where $R^1$, $R^2$, $R^3$, $R^4$ and $R^5$ are each independently selected from H, alkyl, cycloalkyl, heterocycloalkyl, aryl, heteroaryl, arylalkyl, heteroalkyl, alkoxy, hydroxyl, hydroxyalkyl, carboxyl, halo, haloalkyl, amino, aminoalkyl, alkylcarbonyloxy, arylcarbonyloxy, alkoxycarbonyl, alkylcarbonyl, alkylsulfonylamino, aminosulfonyl, sulfonic acid or alkylsulfonyl groups, and also from combinations of two or more of these groups, it being possible for the groups to each be unsubstituted or optionally substituted; where $R^6$ and $R^7$ each independently represent H or an amino, diamino or polyamino group selected from the group consisting of aliphatic, alicyclic or aromatic amine groups, and also combinations of two or more of these groups, it being possible for the groups to each be unsubstituted or optionally substituted;

where Z is selected from a direct bond, —C(O)—, —S—, —O—, —S(O)—, —S(O)$_2$—, —C($R^8$)($R^9$)—, —[C($R^8$)($R^9$)]$_m$—C($R^8$)($R^9$)—[C($R^{10}$)($R^{11}$)]$_n$—, —[C($R^8$)($R^9$)]$_m$—C($R^8$)(aryl)-[C($R^{10}$)($R^{11}$)]$_n$—, —[C($R^8$)($R^9$)]$_m$—C(O)—[C($R^{10}$)($R^{11}$)]$_n$—, —[C($R^8$)($R^9$)]$_m$—S—[C($R^{10}$)($R^{11}$)]$_n$—, —[C($R^8$)($R^9$)]$_m$—O—[C($R^{10}$)($R^{11}$)]$_n$—, —[C($R^8$)($R^9$)]$_m$—S(O)—[C($R^{10}$)($R^{11}$)]$_n$—, —[C($R^8$)($R^9$)]$_m$—S(O)$_2$—[C($R^{10}$)($R^{11}$)]$_n$—, a divalent heterocycle and —[C($R^8$)($R^9$)]$_m$-arylene-[C($R^{10}$)($R^{11}$)]$_n$—, where m and n are each independently from 0 to 10, preferably from 0 to 5, and where $R^8$, $R^9$, $R^{10}$ and $R^{11}$ each independently have the same meaning as the groups $R^1$ to $R^5$.

Furthermore, the hardener component (B) comprises an amine which is selected from the group consisting of aliphatic, alicyclic, aromatic and araliphatic amines and which has on average per molecule at least two reactive hydrogen atoms bonded to a nitrogen atom.

The hardener component (B) is characterized in that the benzoxazine amine adduct is present in the hardener component (B) in a proportion of from 8.5 wt. % to 75 wt. %.

The prior art describes benzoxazine amine adducts which are present in solution form in equilibrium with the relevant benzoxazine and amine component. These mixtures can be polymerized by heating. If an epoxy component is added to a mixture of benzoxazine and amine, a large number of different adducts are formed from these three components, which adducts are also polymerized when heated.

Surprisingly, it has now been found that hardener components which contain benzoxazine amine adducts in a concentration of at least 8.5 wt. % have advantageous properties by comparison with hardener components without these adducts or with the adducts in a lower concentration. If these hardener components are used in multi-component epoxy resin materials, the curing time of the materials at room temperature is reduced by the presence of the benzoxazine amine adducts. This means that follow-up work can be carried out earlier, in particular in the construction sector, and this saves time.

The invention thus also relates to the use of a benzoxazine amine adduct as an accelerator in a hardener component for an epoxy resin material.

The invention makes it possible to use benzoxazine amine adduct-containing epoxy resin materials as what are referred to as "chemical anchors" at temperatures that are common on a construction site. A chemical anchor is thus obtained which has advantageous load properties even after a short curing time at room temperature.

Within the meaning of the invention: an "aliphatic compound" is an acyclic or cyclic, saturated or unsaturated carbon compound, excluding aromatic compounds; an "alicyclic compound" is a compound having a carbocyclic ring structure, excluding benzene derivatives or other aromatic systems; an "aromatic compound" is a compound which follows Hückel's (4n+2) rule; and an "araliphatic compound" is an aliphatic compound having an aromatic backbone such that, in the case of a functionalized araliphatic compound, a functional group that is present is bonded to the aliphatic rather than the aromatic part of the compound.

"Amine" is a compound which is derived from ammonia by replacing one, two or three hydrogen atoms with hydrocarbon groups, and has the general structure $RNH_2$ (primary amine), $R_2NH$ (secondary amine) and $R_3N$ (tertiary amine) (IUPAC, Compendium of Chemical Terminology, 2nd ed. (the "Gold Book"); compiled by A. D. McNaught and A. Wilkinson, Blackwell Scientific Publications, Oxford (1997)).

Within the meaning of the invention, "substituted" means that a hydrogen atom in a hydrocarbon group is replaced by another atom or an atomic group. $R^3$ and $R^5$ in the benzoxazine amine adduct are each preferably H, according to the structures Ia and Ib.

Furthermore, Z is preferably selected from a direct bond, —C($R^8$)($R^9$)—, —C($R^8$)(aryl)-, —C(O)—, —S—, —O—, —S(O)—, —S(O)$_2$—, a divalent heterocycle and —[C($R^8$)($R^9$)]$_m$-arylene-[C($R^{10}$)($R^{11}$)]$_n$—, where m and n are each independently from 0 to 5. Z is particularly preferably selected from a direct bond or —C($R^8$)($R^9$)—, where $R^8$ and $R^9$ are each independently selected from H or $C_1$-$C_4$ alkyl groups, preferably H or methyl, or together form a divalent lactone group.

In an advantageous embodiment, $R^3$ and $R^5$ in the benzoxazine amine adduct are each H, according to the structures Ia and Ib, and Z has the meaning given above.

In a preferred embodiment, the benzoxazine amine adduct is present in the hardener component (B) in a proportion of from 9 wt. % to 65 wt. %, preferably from 9.5 wt. % to 55 wt. %, more preferably from 10 wt. % to 45 wt. %, and particularly preferably from 10 wt. % to 35 wt. %.

The benzoxazine amine adduct is obtained by reacting at least one benzoxazine component with at least one amine component, preferably an aromatic or araliphatic amine, a diamine component and/or polyamine component. Without restricting the scope of the invention, suitable benzoxazines for the preparation of the benzoxazine amine adduct preferably have the following structure:

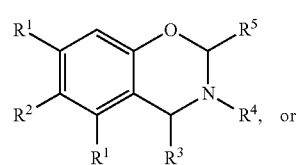

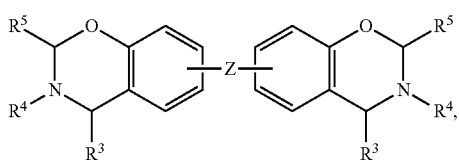
IIb

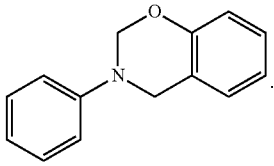
IIg where $R^1$ to $R^5$ and Z have the meanings given above.

In advantageous embodiments of the benzoxazine amine adduct, $R^3$ and $R^5$ each represent H, and Z is selected from a direct bond, —C($R^8$)($R^9$)—, —C($R^8$)(aryl)-, —C(O)—, —S—, —O—, —S(O)—, —S(O)$_2$—, a divalent heterocycle and —[C($R^8$)($R^9$)]$_m$-arylene-[C($R^{10}$)($R^{11}$)]$_n$—, where m and n are each independently from 0 to 5. Z is particularly preferably selected from a direct bond or —C($R^8$)($R^9$)—, where $R^8$ and $R^9$ are each independently selected from H or $C_1$-$C_4$ alkyl groups, preferably H or methyl, or together form a divalent lactone group.

The benzoxazines are preferably selected from the following structures:

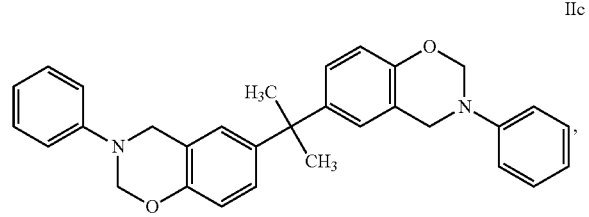
IIc

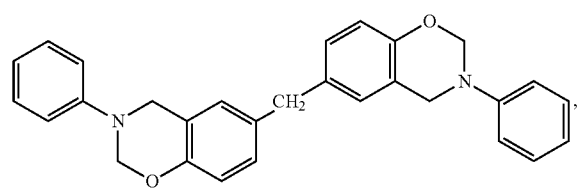
IId

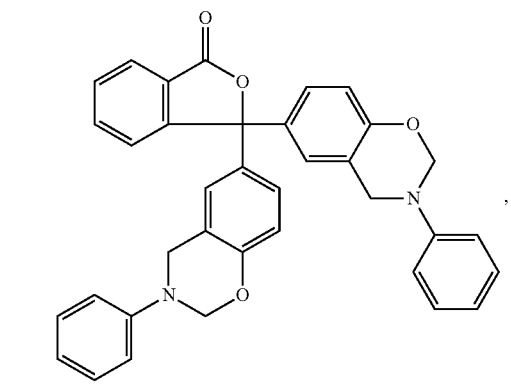
IIe

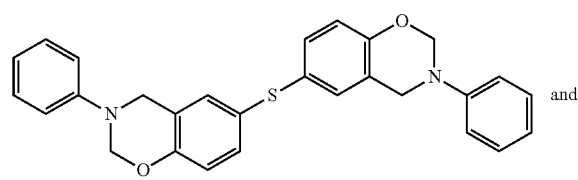
IIf
and

Without restricting the scope of the invention, suitable amines for the preparation of the benzoxazine amine adduct and/or for use as hardeners in the hardener component (B) are preferably selected from the group of the unbranched or branched $C_2$-$C_{10}$ alkyl diamines, the $C_2$-$C_{10}$ polyalkylene polyamines and the aromatic and araliphatic amines which preferably contain a substituted or unsubstituted benzene ring.

The amine can be used either individually or as a mixture of two or more of the mentioned amines. An amine mixture which is composed of two or more amines has been found to be advantageous.

The alkyl diamines are preferably selected from 2,2,4- or 2,4,4-trimethyl-1,6-diaminohexane and mixtures thereof (TMD), 1-amino-3-aminomethyl-3,5,5-trimethylcyclohexane (IPDA), 1,3-bis(aminomethyl)-cyclohexane (1,3-BAC), 1,4-bis(aminomethyl)-cyclohexane (1,4-BAC), 2-methyl-1,5-pentanediamine (DYTEK A), (3(4),8(9)bis(aminomethyl)dicyclo[5.2.1.02,6]decane and isomer mixtures thereof (TCD-diamine), aminomethyltricyclo[5.2.1.02,6]decane and isomer mixtures thereof (TCD amine) and 1,6-hexamethylene diamine.

The polyalkylene polyamines are preferably selected from diethylene triamine (DETA), triethylene tetraamine (TETA), tetraethylene pentamine (TEPA) and pentaethylene hexamine (PEHA).

The aromatic amines are preferably selected from diethylmethylbenzenediamine and 4,4'-sulfonyldianilines and the araliphatic polyamines are preferably selected from 1,3-benzenedimethanamine (mXDA) and 1,4-benzenedimethanamine (pXDA) and N,N'-dimethyl-1,3-benzenedimethanamine.

Particularly preferred amines are 1-amino-3-aminomethyl-3,5,5-trimethylcyclohexane (IPDA), 2-methyl-1,5-pentanediamine (DYTEK A), m-xylylenediamine (mXDA) and 1,3-bis(aminomethyl)-cyclohexane (1,3-BAC) and mixtures thereof.

The following amines are also suitable, for example: 1,2-diaminoethane (ethylenediamine), 1,2-propanediamine, 1,3-propanediamine, 1,4-diaminobutane, 2,2-dimethyl-1,3-propanediamine (neopentanediamine), diethylaminopropylamine (DEAPA), 1,3-diaminopentane, 1,2-bis(aminomethyl)cyclohexane, 1,2- and 1,4-diaminocyclohexane (1,2-DACH and 1,4-DACH), bis(4-aminocyclohexyl)methane, bis(4-amino-3-methylcyclohexyl)methane, 4-azaheptane-1,7-diamine, 1,11-diamino-3,6,9-trioxundecane, 1,8-diamino-3,6-dioxaoctane, 1,5-diamino-methyl-3-azapentane, 1,10-diamino-4,7-dioxadecane, bis(3-aminopropyl)amine, 1,13-diamino-4,7,10-trioxatridecane, 4-aminomethyl-1,8-diaminooctane, 2-butyl-2-ethyl-1,5-diaminopentane, N,N-bis-(3-aminopropyl)methylamine, 5-(aminomethyl)bicyclo[[2.2.1]hept-2-yl]methylamine (NBDA, norbornane diamine), dimethyldipropylenetriamine, dimethylaminopropyl-aminopropylamine (DMAPAPA), diaminodicyclohexylmethane (PACM), mixed polycyclic amines (MPGA) (e.g. Ancamine 2168), dimethyldiaminodicyclohexylmethane (Laromin C260), N-ethylaminopiperazine (N-EAP), 1,14- diamino-4,11-dioxatetradecane, dipropylenetriamine, N,N'-dicyclohexyl-1,6-hexanediamine, N,N'-dimethyl-1,3-diaminopropane, N,N'-diethyl-1,3-diaminopropane, N,N-dimethyl-1,3-diaminopropane, secondary polyoxypropylene di- and triamines, 2,5-diamino-2,5-dimethylhexane, bis(amino-methyl)tricyclopentadiene, 1,8-diamino-p-menthane, bis-(4-amino-3,5-dimethylcyclohexyl)methane, dipentylamine, N-2-(aminoethyl)piperazine (N-AEP), N-3-(aminopropyl)piperazine and piperazine.

All of the substances mentioned above or mixtures thereof can be used as benzoxazine and amine components for the preparation of a benzoxazine amine adduct according to the invention. Various methods for the preparation of the benzoxazine amine adduct are known to a person skilled in the art.

To prepare the benzoxazine amine adduct, one of the above-mentioned benzoxazine components is preferably dissolved in a solvent and reacted with the amine component at an elevated temperature. The amine is preferably added in excess. Instead of the solvent, the benzoxazine can also be dissolved in an excess of amine component.

The reaction time is preferably 30 hours or less, more preferably 26 hours or less, and particularly preferably at most approximately 24 hours.

The reaction temperature is preferably at least 50° C. and less than 80° C., preferably less than 75° C., more preferably less than 70° C., even more preferably less than 65° C., and particularly preferably less than 60° C. The obtained benzoxazine amine adduct is obtained in isolation or as a solution in the amine component.

According to a further method, the benzoxazine component is dissolved in the amine component. It can be mixed with other substances, in particular with substances that are additionally used in a hardener component (B). The mixture is stored for at least five days, preferably at least six days, more preferably at least one week, at room temperature (21° C.) in order to obtain a mixture having a proportion of benzoxazine amine adduct of at least 8.5 wt. %. If the mixture is not stored for a sufficiently long time, the benzoxazine amine adduct concentration is not sufficiently high.

The hardener component (B) further comprises an amine as a hardener. The amine used as the hardener is a diamine or polyamine selected from the group consisting of aliphatic, alicyclic, aromatic and araliphatic amines and has on average per molecule at least two reactive hydrogen atoms bonded to a nitrogen atom. The amine can be selected from all of the amines mentioned above and the amines that are usual for epoxy amine systems and known to a person skilled in the art.

The amine used as the hardener and the amine used to prepare the benzoxazine amine adduct can be the same or different. The same amines are preferably used as the hardener and for preparing the benzoxazine amine adduct.

Thiols, dithiols and/or polythiols, preferably selected from the group consisting of aliphatic, alicyclic, aromatic and araliphatic thiols and mixtures thereof, can also be used as a replacement for the amines and/or as a further additive for the hardener component (B).

In a further advantageous embodiment, the hardener component (B) comprises at least one further additive selected from the group of accelerators, adhesion promoters, thickeners and fillers.

Novolacs, in particular novolac resins, and styrenated phenols can be used as accelerators. Further accelerators which are preferably used together with the novolacs and/or styrenated phenols are, for example, tertiary amines, imidazoles or tertiary aminophenols, organophosphines, Lewis bases or acids such as phosphoric acid esters, or mixtures of two or more thereof.

The accelerators are contained in the hardener component (B) in a proportion by weight of from 0.001 to 20 wt. %, preferably from 0.001 to 5 wt. %, based on the total weight of the hardener component (B). Examples of suitable accelerators are in particular tris-2,4,6-dimethylaminomethylphenol, 2,4,6-tris(dimethylamino)phenol and bis[(dimethylamino)methyl]phenol. A suitable accelerator mixture contains 2,4,6-tris(dimethylaminomethyl)phenol and bis(dimethylaminomethyl)phenol. Mixtures of this kind are commercially available, for example as Ancamine® K54 (AirProducts, Belgium).

By using an adhesion promoter, the cross-linking of the borehole wall with the mortar composition is improved such that the adhesion increases in the cured state. Suitable adhesion promoters are selected from the group of silanes that are functionalized with further reactive organic groups, such as 3-glycidoxypropyltrimethoxysilane, 3-glycidoxypropyltriethoxysilane, 2-(3,4-epoxycyclohexyl)ethyltrimethoxysilane, N-2-(aminoethyl)-3-aminopropylmethyldiethoxysilane. N-2-(aminoethyl)-3-aminopropyltriethoxysilane, 3-aminopropyltrimethoxysilane, 3-aminopropyltriethoxysilane, N-phenyl-3-aminoethyl-3-aminopropyl-trimethoxysilane, 3-mercaptopropyltrimethoxysilane and 3-mercaptopropylmethyldimethoxysilane. In particular, 3-aminopropyl-triethoxysilane and 3-glycidyloxypropyl-trimethoxysilane are preferred as adhesion promoters.

The adhesion promoter may be contained in an amount of up to 10 wt. %, preferably from 0.1 wt. % to 5 wt. %, based on the total weight of the hardener component (B).

Silicic acids are preferably used as thickeners. A thickener may be contained in an amount of up to 10 wt. %, preferably from 0.1 wt. % to 5 wt. %, based on the total weight of the hardener component (B).

Inorganic fillers, in particular cements such as Portland cement or high-alumina cement and other hydraulically setting inorganic substances, quartz, glass, corundum, porcelain, earthenware, baryte, light spar, gypsum, talc and/or chalk and mixtures thereof are preferably used as fillers. The inorganic fillers can be added in the form of sands, flours, or molded bodies, preferably in the form of fibers or balls. The proportion of fillers is preferably from 0 wt. % to 90 wt. %, more preferably from 10 wt. % to 90 wt. %, even more preferably from 15 wt. % to 75 wt. %, yet more preferably from 20 wt. % to 50 wt. %, and most preferably from 25 wt. % to 30 wt. %, based on the total weight of the hardener component (B).

In an advantageous embodiment, the hardener component (B) has an AHEW (Amine Hydrogen Equivalent Weight) of from 20 to 1000 g/EQ, preferably from 30 to 500 g/EQ, more preferably from 40 to 350 g/EQ, even more preferably from 50 to 225 g/EQ, and particularly preferably from 50 to 150 g/EQ. The AHEW value is determined from the molecular weight (Mw) of the amine divided by the number of reactive hydrogen atoms per molecule (H eq.=Mw/functionality).

Experimentally, the AHEW value can be obtained by determining the glass transition temperature (Tg) from a mixture of epoxy resin (with known EEW) and an amine component. In this case, the glass transition temperatures of epoxy resin/amine mixtures are determined with different ratios. The sample is cooled at a heating rate of −20 K/min from 21 to −70° C., heated in a first heating cycle to 250° C. (heating rate 10 K/min), then re-cooled to −70° C. (heating rate −20 K/min) and heated to 200° C. in the last step (20 K/min). The mixture having the highest glass transition temperature in the second heating cycle ("Tg2") has the optimum ratio of epoxy resin and amine. The AHEW value can be calculated from the known EEW and the optimum epoxy resin/amine ratio.

Example: EEW=158 g/mol

Amine/epoxy resin mixture having a maximum Tg2: 1 g amine with 4.65 g epoxy resin $$AHEW \text{ (amine)} = \frac{158}{4.65} = 34$$

The present invention also relates to a multi-component epoxy resin material having an epoxy resin component (A), which contains at least one hardenable epoxy resin, and a hardener component (B) as described above.

The multi-component epoxy resin material is preferably used for construction purposes. The expression "for construction purposes" refers to the structural adhesion of concrete/concrete, steel/concrete or steel/steel or one of said materials with other mineral materials, to structural strengthening of components made of concrete, brickwork and other mineral materials, to reinforcement applications with fiber-reinforced polymers of building objects, to chemical fastening of surfaces made of concrete, steel or other mineral materials, in particular chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood.

The above statements regarding the hardener component (B) according to the invention and its composition also apply to the multi-component epoxy resin material.

A large number of the compounds known to a person skilled in the art and commercially available for this purpose which contain on average more than one epoxide group, preferably two epoxide groups, per molecule can be used as a hardenable epoxide in the epoxy resin component (A). These epoxy resins may be both saturated and unsaturated as well as aliphatic, alicyclic, aromatic or heterocyclic, and may also have hydroxyl groups. They may also contain substituents which do not cause disruptive secondary reactions under the mixing or reaction conditions, for example alkyl or aryl substituents, ether groups and the like. Trimeric and tetrameric epoxides are also suitable in the context of the invention.

The epoxy resins are preferably glycidyl ethers which are derived from polyhydric alcohols, in particular from polyhydric phenols such as bisphenols and novolacs, in particular those having an average glycidyl group functionality of 1.5 or greater, in particular 2 or greater, for example from 2 to 10.

Examples of the polyhydric phenols used to prepare the epoxy resins are resorcinol, hydroquinone, 2,2-bis-(4-hydroxyphenyl)propane (bisphenol A), isomer mixtures of dihydroxyphenylmethane (bisphenol F), tetrabromobisphenol A, novolacs, 4,4'-dihydroxyphenylcyclohexane and 4,4'-dihydroxy-3,3'-dimethyldiphenylpropane.

The epoxy resin is preferably a diglycidyl ether of bisphenol A or bisphenol F or a mixture thereof. Liquid diglycidyl ethers based on bisphenol A and/or F having an epoxy equivalent weight (EEW) of from 150 to 300 g/EQ are particularly preferably used.

Further examples are hexanediol diglycidyl ether, trimethylolpropane triglycidyl ether, bisphenol A-epichlorohydrin resins and/or bisphenol F-epichlorohydrin resins, for example having an average molecular weight of Mn≤2000 g/mol.

The proportion of epoxy resin in the epoxy component (A) is >0 wt. % to 100 wt. %, preferably from 10 to 70 wt. % and particularly preferably from 30 wt. % to 60 wt. %, based on the total weight of the resin component (A).

In addition to the epoxy resins, the epoxy resin component (A) may optionally contain at least one reactive diluent. Glycidyl ethers of aliphatic, alicyclic or aromatic mono- or in particular polyalcohols having a lower viscosity than epoxides containing aromatic groups are used as reactive diluents. Examples of reactive diluents are monoglycidyl ethers, e.g. o-cresyl glycidyl ether, and glycidyl ethers having an epoxide functionality of at least 2, such as 1,4-butanediol diglycidyl ether (BDDGE), cyclohexanedimethanol diglycidyl ether and hexanediol diglycidyl ether, as well as tri- or higher glycidyl ethers, such as glycerol triglycidyl ether, pentaerythritol tetraglycidyl ether or trimethylolpropane triglycidyl ether (TMPTGE). Mixtures of two or more of these reactive diluents may also be used, preferably mixtures containing triglycidyl ethers, particularly preferably as a mixture of 1,4-butanediol diglycidyl ether (BDDGE) and trimethylolpropane triglycidyl ether (TMPTGE).

The reactive diluents are preferably present in an amount of from 0 wt. % to 60 wt. %, more preferably from 1 wt. % to 20 wt. %, based on the total weight of the resin component (A).

Suitable epoxy resins and reactive diluents can also be found in the standard reference from Michael Dornbusch, Ulrich Christ and Rob Rasing, "Epoxidharze," Vincentz Network GmbH & Co. KG (2015), ISBN 13: 9783866308770. These compounds are included here by reference.

In a further embodiment, the epoxy resin component (A) may contain a co-accelerator, provided that this is compatible with the epoxy resins. Tertiary amines, imidazole or tertiary aminophenols, organophosphines, Lewis bases or acids such as phosphoric acid esters, or mixtures of two or more thereof, may be used as co-accelerators, for example. As mentioned above, these co-accelerators can also be present in the hardener component (B).

Examples of suitable co-accelerators are in particular tris-2,4,6-dimethylaminomethylphenol, 2,4,6-tris(dimethylamino)phenol and bis[(dimethylamino)methyl]phenol. A suitable co-accelerator mixture contains 2,4,6-tris(dimethylaminomethyl)phenol and bis(dimethylaminomethyl)phenol. Mixtures of this kind are commercially available, for example as Ancamine® K54 (AirProducts, Belgium).

The proportion of the epoxy component (A) in relation to the total weight of the multi-component epoxy resin material is preferably from 5 wt. % to 90 wt. %, more preferably from 20 wt. % to 80 wt. %, even more preferably from 30 wt. % to 80 wt. % or most preferably from 40 wt. % to 80 wt. %.

The epoxy resins can have an EEW of from 120 to 2000 g/Eq, preferably from 140 to 400 g/Eq, in particular from 150 to 300 g/Eq. Mixtures of a plurality of epoxy resins may also be used.

The hardener component (B) may comprise the compositions and constituents specified above.

The proportion of the hardener component (B) in relation to the total weight of the multi-component epoxy resin material is preferably from 10 wt. % to 95 wt. %, more preferably from 15 wt. % to 80 wt. %, even more preferably from 15 wt. % to 60 wt. % or particularly preferably from 20 wt. % to 40 wt. %.

In an advantageous embodiment, the multi-component epoxy resin material according to the invention comprises further additives selected from the group of accelerators, adhesion promoters, reactive diluents, thickeners and fillers. These additives may be the same additives as described above for the hardener component (B).

The adhesion promoter may be contained in an amount of up to 10 wt. %, preferably from 0.1 wt. % to 5 wt. %, based on the total weight of the epoxy resin component (A).

The inorganic fillers described above are preferably used as fillers. The fillers may also be present in one or all components of the multi-component mortar composition. The proportion of fillers is preferably from 0 wt. % to 90 wt. %, for example from 10 wt. % to 90 wt. %, preferably from 15 wt. % to 75 wt. %, more preferably from 20 wt. % to 50 wt. %, and even more preferably from 25 wt. % to 40 wt. %, based on the total weight of the mortar composition.

Further conceivable additives to the multi-component epoxy resin material are also thixotropic agents such as optionally organically after-treated fumed silica, bentonites, alkyl- and methylcelluloses and castor oil derivatives, plasticizers such as phthalic or sebacic acid esters, stabilizers, antistatic agents, thickeners, flexibilizers, hardening catalysts, rheology aids, wetting agents, coloring additives such as dyes or pigments, for example for different staining of components for improved control of their mixing, as well as wetting agents, desensitizing agents, dispersants and other control agents for the reaction rate, or mixtures of two or more thereof.

Non-reactive diluents (solvents) may preferably also be contained in an amount of up to 30 wt. %, based on the total weight of the relevant component (epoxy resin component and/or hardener component), for example from 1 wt % to 20 wt. %. Examples of suitable solvents are lower alkyl ketones such as acetone, di lower alkyl lower alkanoyl amides such as dimethylacetamide, lower alkyl benzenes such as xylenes or toluene, phthalic acid esters or paraffins.

Further additives of this kind may preferably be added in proportions by weight of a total of from 0 wt. % to 40 wt. %, based on the total weight of the mortar composition.

The multi-component mortar composition is preferably present in cartridges or film pouches which are characterized in that they comprise two or more separate chambers in which the epoxy resin component (A) and the hardener component (B) of the mortar composition are separately arranged so as to prevent a reaction.

For the use as intended, the epoxy resin component (A) and the hardener component (B) are discharged out of the separate chambers and mixed in a suitable device, for example a static mixer or dissolver. The mixture of epoxy resin component (A) and hardener component (B) is then introduced into the previously cleaned borehole by means of a known injection device. The component to be fixed is then inserted into the mortar composition and aligned. The reactive constituents of the hardener component (B) react with the epoxides of the resin component (A) by polyaddition such that the mortar composition cures under environmental conditions within a desired period of time, preferably within a few hours.

The multi-component epoxy resin material preferably cures at ambient temperature. Ambient temperature is understood to mean the temperature that prevails at the place of use, preferably at a construction site, for example from 5 to 40° C.

Curing at room temperature (21° C.) preferably takes less than 48 hours, preferably less than 30 hours, more preferably less than 24 hours, even more preferably less than 18 hours, yet more preferably less than 12 hours and most preferably less than 9 hours.

The multi-component epoxy resin material according to the invention is preferably used for chemical fastening, in particular for anchoring fastening elements in boreholes.

Further advantages of the invention can be found in the following description of preferred embodiments, which are not understood to be in any way limiting, however. All embodiments of the invention can be combined with one another within the scope of the invention.

EXAMPLES

Epoxy Resin Component (A)

In the examples, the bisphenol A-based and bisphenol F-based epoxy resins commercially available under the names DER 330 and DER 354 (Dow Europe), respectively, were used as the epoxy resins.

3-glycidyloxypropyl-trimethoxysysilane available under the name Dynalsylan GLYMO™ (Evonik Industries) was used as the adhesion promoter.

The 1,4-butanediol-diglycidyl ether and trimethyolpropane-triglycidyl ether commercially available under the names Polypox™ R3 (Dow Europe) and Araldite™ DY-T (Huntsman), respectively, were used as reactive diluents.

The liquid components were premixed by hand. Subsequently, quartz (Millisil™ W12 from Quarzwerke Frechen) was added as a filler and silicic acid (Cab-O-Sil™ TS-720 from Cabot Rheinfelden) was added as a thickener and the mixture was stirred in a dissolver (PC laboratory system, volume 1 L) for 10 minutes under a vacuum at 3500 rpm.

The composition of the epoxy resin component (A) used in the examples is given in table 1 below.

TABLE 1

Composition of epoxy resin component (A)

| Substance | Function | Percent by weight [wt. %] |
| --- | --- | --- |
| 3-glycidyloxypropyl-trimethoxysysilane | Adhesion promoter | 2.6 |
| Bisphenol A-based epoxy resin | Epoxy resin | 31.3 |
| Bisphenol F-based epoxy resin | Epoxy resin | 16.7 |
| 1,4-butanediol-diglycidyl ether | Reactive diluent | 6.0 |
| Trimethyolpropane-triglycidyl ether | Reactive diluent | 6.0 |
| Quartz | Filler | 34.7 |
| Silicic acid | Thickener | 2.7 |
| EEW [g/Eq] | | 256 |

Hardener Component (B)
Starting Materials

The benzoxazines used to prepare the hardener component (B) are available under the trade names Araldite MT 35600 CH (benzoxazine A; CAS number; 154505-70-1), Araldite MT 35700 CH (benzoxazine F; CAS number: 214476-06-9) and Araldite MT 35710 FST (benzoxazine FST: mixture of benzoxazine F and 3-phenyl-3,4-dihydro-2H-benzo[e][1,3]oxazine) from Huntsman Advanced Materials, Basel, Switzerland. 1,3-cyclohexanedimethanamine (1,3-BAC) and m-xylylenediamine (mXDA) from Itochu Deutschland and 2-methlypentamethylenediamine (Dytek A) from Invista, the Netherlands, were used as amines for preparing the hardener component (B).

In addition, a mixture of 2,4,6-tris(dimethylaminomethyl) phenol and bis[(dimethylamino)-methyl]phenol, which is available under the trade name Ancamine™ K45 from Air Products, was added to the hardener components as an accelerator.

3-aminopropyl-triethoxysilane, which is available under the trade name Dynasylan AMEO from Evonik Degussa, was used as an adhesion promoter.

Quartz (Millisil™ W12 from Quarzwerke Frechen) was used as a filler and silicic acid (Cab-O-Sil™ TS-720 from Cabot Rheinfelden) was used as a thickener.

Preparation of the Benzoxazine Amine Adduct
Variant A

Benzoxazine (1 eq) was dissolved in chloroform. The amine (2.4 eq) was added in drops at room temperature (RT) under nitrogen. The solution was then heated for 24 hours to 55° C. After this time, the chloroform was removed by distillation under reduced pressure. A yellow substance which was solid at room temperature was obtained.

The following benzoxazine amine adduct was prepared according to variant A:
A1: Benzoxazine F/Dytek A

Variant B

Benzoxazine was dissolved in excess amine and the solution was heated, with stirring, for 24 hours to 55° C. A yellow to yellow-brown viscous solution was obtained (benzoxazine/amine adduct approx. 60% in amine).

The following benzoxazine amine adducts were prepared according to variant B:
B1: Benzoxazine A/Dytek A, 60% in Dytek A
B2: Benzoxazine F/1,3-BAC, 60% in 1,3-BAC
B3: Benzoxazine F/mXDA, 60% in mXDA
B4: Benzoxazine FST/1,3-BAC, 60% in 1,3-BAC
B5: Benzoxazine F/IPDA, 55% in IPDA

Variant C

Benzoxazine was dissolved in amine according to a formulation for the preparation of a hardener component (B). The remaining components of the hardener component (B) were then added to this solution according to the relevant formulation and stirred in a dissolver (PC laboratory system, volume 1 L) for 10 minutes under a vacuum at 3500 rpm. The hardener component (B) prepared in this way was stored for at least one week before being mixed with the epoxy resin component (A), in order to ensure the reaction of the benzoxazine with the amine for forming the benzoxazine amine adduct.

According to variant C, a hardener component (B) comprising a benzoxazine/amine adduct was prepared using the following benzoxazine:
C1: Benzoxazine F
C2: Benzoxazine FST

Examples 1 to 12

To prepare the hardener component (B) from examples 1 to 12 below, the relevant benzoxazine amine adduct or the benzoxazine was dissolved in the liquid constituents or introduced as a solution in amine (variant B). Quartz powder and silicic acid were then added and stirred in a dissolver (PC laboratory system, volume 1 L) for 10 minutes under a vacuum at 3500 rpm.

The hardener component (B) prepared according to variant C above was stored at room temperature for at least one week to ensure the formation of a sufficient amount of the benzoxazine/amine adduct.

The composition of the hardener components (B) prepared in this way is given in table 2 below.

TABLE 2

Composition of the hardener component (B)

| Component | 1 | 2 | 3 | 4 | 5 | 6 | 7 | 8 | 9 | 10 | 11 | 12 |
|---|---|---|---|---|---|---|---|---|---|---|---|---|
| | | | | | | Wt. % | | | | | | |
| A1 | 29.9 | | | | 29.9 | | | | | | | |
| B1 | | 50.0 | | | | | | | | | | |
| B2 | | | 50.0 | | | | | | | | | |
| B3 | | | | 50.0 | | | | | | 50.0 | 27.3 | |
| B4 | | | | | | 50.0 | | | 27.3 | | | |
| B5 | | | | | | | | | | | | 29.2 |
| C1 | | | | | | | 19.5 | | | | | |
| C2 | | | | | | | | 18.1 | | | | |
| mXDA | 24.1 | | | 4.0 | | | | | | 4.0 | 26.7 | |
| Dytek A | | 4.0 | | | | | 34.5 | | | | | |
| 1,3-BAC | | | 4.0 | | 24.1 | 4.0 | | 35.9 | 26.7 | | | 29.2 |
| Adhesion promoter | 2.4 | 2.4 | 2.4 | 2.4 | 2.4 | 2.4 | 2.4 | 2.4 | 2.4 | 2.4 | 2.4 | 2.4 |
| Accelerator | 1.9 | 1.9 | 1.9 | 1.9 | 1.9 | 1.9 | 1.9 | 1.9 | 1.9 | 1.9 | 1.9 | 2.4 |
| Filler | 39 | 39 | 39 | 39 | 39 | 39 | 39 | 39 | 39 | 39 | 39 | 32.5 |
| Thickener | 2.7 | 2.7 | 2.7 | 2.7 | 2.7 | 2.7 | 2.7 | 2.7 | 2.7 | 2.7 | 2.7 | 4.3 |
| AHEW [g/Eq] | 100 | 83 | 97 | 85 | 103 | 97 | 83 | 97 | 79 | 94 | 76 | 83 |

Comparative Examples 1 to 9

To prepare the hardener component (B) according to comparative examples 1 to 4 and 7 to 9 below, the amine was added to a benzoxazine component and stirred at room temperature for less than 24 hours. The remaining liquid constituents were then added. The quartz powder and silicic acid were then added and stirred in a dissolver (PC laboratory system, volume 1 L) for 10 minutes under a vacuum at 3500 rpm. In order to prevent the benzoxazine from reacting with the amine to form the benzoxazine amine adduct, the hardener component (B) prepared in this way was mixed with the epoxy resin component (A) no later than 48 hours after the amine was added to the benzoxazine, and the curing as an anchor began.

The hardener component (B) for comparative examples 5 and 6 was prepared using a benzoxazine/amine adduct prepared according to variant B described above.

Table 3 shows the composition of the hardener components (B) from comparative examples 1 to 9.

TABLE 3

Composition of the hardener component (B)

| | Comparative example | | | | | | | | |
|---|---|---|---|---|---|---|---|---|---|
| Component | 1 | 2 | 3 | 4 | 5 Wt. % | 6 | 7 | 8 | 9 |
| B4 | | | | | 13.5 | 4.9 | | | |
| Benzoxazine F | 19.5 | | | | | | 18.6 | 10.0 | |
| Benzoxazine FST | | | 18.1 | 10.0 | | | | | |
| mXDA | | | | | | | 35.4 | 44.0 | 54.0 |
| Dytek A | 34.5 | 54.0 | | | | | | | |
| 1,3-BAC | | | 35.9 | 44.1 | 40.5 | 49.1 | | | |
| Adhesion promoter | 2.4 | 2.4 | 2.4 | 2.4 | 2.4 | 2.4 | 2.4 | 2.4 | 2.4 |
| Accelerator | 1.9 | 1.9 | 1.9 | 1.9 | 1.9 | 1.9 | 1.9 | 1.9 | 1.9 |
| Filler | 39 | 39 | 39 | 39 | 39 | 39 | 39 | 39 | 39 |
| Thickener | 2.7 | 2.7 | 2.7 | 2.7 | 2.7 | 2.7 | 2.7 | 2.7 | 2.7 |
| AHEW [g/Eq] | 83 | 53 | 97 | 79 | 71 | 67 | 94 | 76 | 62 |

Mortar Compositions and Pull-Out Tests

The epoxy resin component (A) and the hardener component (B) were mixed in a speed mixer in a ratio resulting in a balanced stoichiometry according to the EEW and AHEW values. The mixture was poured into a one-component cartridge as far as possible without bubbles, and was immediately injected into the borehole made for the pull-out tests.

The pull-out strength of the mortar compositions obtained by mixing the epoxy resin component (A) and hardener component (B) according to the above examples was determined using a high-strength anchor threaded rod M12 according to ETAG 001 Part 5, which was doweled into a hammer- or diamond-drilled borehole having a diameter of 14 mm and a borehole depth of 72 mm by means of the relevant mortar composition in C20/25 concrete.

For this purpose, the boreholes were filled up, by two thirds from the bottom of the borehole, with the mortar composition to be tested in each case. The threaded rod was pushed in by hand. The excess mortar was removed using a spatula.

The tested boreholes were made using a hammer drill in tests 1 to 6, 8 and 9, and using a diamond drill in test 7.

In tests 1 to 6 and 8 and 9, the borehole was cleaned twice with compressed air (6 bar), brushed twice and then blown out again twice with compressed air (6 bar). In test 7, the borehole was rinsed once, brushed once, rinsed again, blown out for 10 seconds, brushed again and blown out again for 10 seconds.

The curing time in test 1 was 24 hours at 23° C. In tests 2 to 6, the curing time was 6 hours at 23° C., and the curing time in test 7 was 48 hours at 23° C.

In test 8, the borehole was filled with water after being drilled and cleaned. The mortar was injected into the water-filled borehole via a mixer extension comprising a piston plug. The curing time of the mortar was 48 hours at 23° C.

In test 9, the curing time in the wet borehole was 24 hours at 23° C., followed by storage for 48 hours at 80° C. and the anchor being pulled at a concrete temperature of 80° C. +/−2° C.

The failure load was determined by centrally pulling out the anchor threaded rod with a narrow support. The load values obtained with the mortar compositions using a hardener component (B) according to examples 1 to 11 and comparative examples 1 to 9 are shown in table 4 below.

TABLE 4

Determination of the load values

| | | Example | | | | | | | | | | | |
|---|---|---|---|---|---|---|---|---|---|---|---|---|---|
| Pull-out tests | Test number | 1 | 2 | 3 | 4 | 5 | 6 | 7 | 8 | 9 | 10 | 11 | 12 |
| | | | | | | Load value [N/m] | | | | | | | |
| Dry concrete (hammer drilled) | | | | | | | | | | | | | |
| 24 h curing | 1 | 40.1 | 36.4 | 38.1 | 37.5 | 38.0 | 37.3 | 38.6 | 37.4 | | | | 35.4 |
| 6 h curing | 2 | | 16.2 | | | | | | | | | | |

TABLE 4-continued

Determination of the load values

| | | | | | | | | | | |
|---|---|---|---|---|---|---|---|---|---|---|
| 6 h curing | 3 | | | | 22.6 | | | 15.6 | | |
| 6 h curing | 4 | | | | | | | | | 17.7 |
| 6 h curing | 5 | | | | | | | | | |
| 6 h curing | 6 | | | | | | | | | 10.6 |
| Wet concrete | | | | | | | | | | |
| 48 h curing (diamond drilled) | 7 | 35.9 | 32.2 | 35.9 | 36.2 | 36.2 | 34.7 | | 33.4 | |
| 48 h curing (hammer drilled) | 8 | 23.9 | 23.8 | 24.7 | 27.3 | | 21.0 | | 24.6 | |
| 24 h curing (storage at 80° C.) | 9 | 21.9 | 19.5 | 24.5 | 22.0 | 24.2 | 25.3 | 20.2 | 26.4 | 25.6 |

| | | Comparative example | | | | | | | | |
|---|---|---|---|---|---|---|---|---|---|---|
| Pull-out tests | Test number | 1 | 2 | 3 | 4 | 5 | 6 | 7 | 8 | 9 |
| | | Load value [N/m] | | | | | | | | |
| Dry concrete (hammer drilled) | | | | | | | | | | |
| 24 h curing | 1 | | | | | 38.3 | 38.4 | | | |
| 6 h curing | 2 | 7.5 | 2.3 | | | | | | | |
| 6 h curing | 3 | | | 15.7 | | | | | | |
| 6 h curing | 4 | | | | 10.3 | 7.4 | 7.6 | | | |
| 6 h curing | 5 | | | | | | | 15.1 | | |
| 6 h curing | 6 | | | | | | | | | |
| Wet concrete | | | | | | | | | | |
| 48 h curing (diamond drilled) | 7 | | | | | 33.9 | | | | |
| 48 h curing (hammer drilled) | 8 | | | | | 24.8 | | | | |
| 24 h curing (storage at 80° C.) | 9 | | | | | 23.8 | | | | |

The mortar compositions from comparative examples 1, 3, 4, 7 and 8 each contain the same amount of benzoxazine as the compositions from examples 2, 6, 9, 10 and 11. The examples according to the invention and the corresponding comparative example (e.g. comparative example 7 and example 10) thus have comparable compositions, but the benzoxazine and amine have already reacted to form the adduct in the examples according to the invention, whereas both species are still in free form in the comparative examples.

The pull-out tests after 6 hours show that the mortar compositions of the examples according to the invention each have higher load values than the compositions of the comparative examples in which benzoxazine and amine are still in free form.

The compositions which contain very little or no benzoxazine have the lowest load values after six hours (comparative examples 2, 5, 6 and 9). In the pull-out tests, the benzoxazine amine adduct already exhibits a significant accelerating effect after six hours, by comparison with the compositions not involving benzoxazine and also by comparison with the compositions in which benzoxazine and amine are in free form. The free benzoxazine also already has an accelerating effect, which, however, is not as pronounced as the accelerating effect of the benzoxazine amine adduct.

From test 9 it can be seen that, by contrast with the amine, the type of benzoxazine has no influence on the curing time. If a benzoxazine amine adduct is present in a sufficiently high concentration, this accelerates the curing of the mortar composition.

Determination of the Curing Time

An epoxy resin component (A) having the composition given in table 5 below was prepared. The liquid components were mixed and stirred in a dissolver (PC laboratory system, volume 1 L) for 10 minutes under a vacuum at 3500 rpm.

TABLE 5

Epoxy resin component (A)

| Substance | Function | Percent by weight [wt. %] |
|---|---|---|
| Bisphenol A-based epoxy resin | Epoxy resin | 31.3 |
| Bisphenol F-based epoxy resin | Epoxy resin | 16.7 |
| 1,4-butanediol-diglycidyl ether | Reactive diluent | 6.0 |
| Trimethyol-propane-triglycidyl ether | Reactive diluent | 6.0 |
| EEW [g/Eq] | | 256 |

The following mixtures or compounds were used as hardener component (B):

Example 13

Benzoxazine amine adduct of benzoxazine FST and 1,3-BAC (60% in 1,3-BAC; AHEW=56 g/EQ), prepared according to variant B above.

Comparative Example 10

Solution consisting of benzoxazine FST (Araldite MT 35710 FST) in 1,3-BAC (36.2% benzoxazine FST in 1,3-BAC; AHEW=56 g/EQ). The solution was prepared 24 hours before the measurement and stored at room temperature.

Comparative Example 11

Only the amine 1,3-BAC (AHEW=35.6 g/EQ) was used.

The epoxy resin component (A) was weighed out and heated to 5° C. After approximately 30 minutes, the 5° C. hardener component (B) was added. The batch was mixed in a speed mixer for one minute at 1500 rpm, then transferred to a pot and immediately placed in the oven once the sample size had been noted down.

The curing time of the mixture was determined by means of DSC measurements. The curing was monitored in the DSC apparatus as an isothermal measurement at 21° C. for 24 hours. The results of the DSC measurements are given in table 6 below.

TABLE 6

| Example | End of curing [min] |
|---|---|
| DSC measurements | |
| Example 13 | 358 |
| Comparative example 10 | 538 |
| Comparative example 11 | 601 |

As with the determination of the load values after six hours, the DSC measurement also shows that curing is quickest when the benzoxazine amine adduct is used as the hardener component (B). If the benzoxazine and the amine are unreacted in free form, the reaction is only accelerated by approximately 60 minutes by comparison with the comparative example not involving benzoxazine.

The invention claimed is:

1. A hardener component for a multi-component epoxy resin material for chemical fastening of construction elements, the hardener component comprising:
   a benzoxazine amine adduct, selected from the group consisting of a substance according to formula Ia:

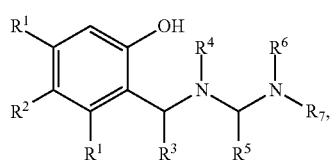

Ia a substance according to formula Ib:

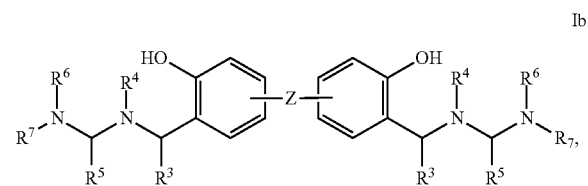

Ib a mixture thereof,
   wherein $R^1$, $R^2$, $R^3$, $R^4$, and $R^5$ are each independently selected from the group consisting of H, alkyl, cycloalkyl, heterocycloalkyl, aryl, heteroaryl, arylalkyl, heteroalkyl, alkoxy, hydroxyl, hydroxyalkyl, carboxyl, halo, haloalkyl, amino, aminoalkyl, alkylcarbonyloxy, arylcarbonyloxy, alkoxycarbonyl, alkylcarbonyl, alkylsulfonylamino, aminosulfonyl, sulfonic acid, alkylsulfonyl groups, and a combination thereof, wherein each of the groups is unsubstituted or optionally substituted;
   wherein $R^6$ and $R^7$ each independently represent H or an amino, diamino or polyamino group selected from the group consisting of aliphatic, alicyclic, aromatic, araliphatic amine groups, and a combination thereof, wherein each of the groups is unsubstituted or optionally substituted;
   wherein Z is selected from the group consisting of a direct bond, —C(O)—, —S—, —O—, —S(O)—, —S(O)$_2$—, —C($R^8$)($R^9$)—, —[C($R^8$)($R^9$)]$_m$—C($R^8$)($R^9$)—[C($R^{10}$)($R^{11}$)]$_n$—, —[C($R^8$)($R^9$)]$_m$—C($R^8$)(aryl)-[C($R^{10}$)($R^{11}$)]$_n$—, —[C($R^8$)($R^9$)]$_m$—C(O)—[C($R^{10}$)($R^{11}$)]$_n$—, —[C($R^8$)($R^9$)]$_m$—S—[C($R^{10}$)($R^{11}$)]$_n$—, —[C($R^8$)($R^9$)]$_m$—O—[C($R^{10}$)($R^{11}$)]$_n$—, —[C($R^8$)($R^9$)]$_m$—S(O)—[C($R^{10}$)($R^{11}$)]$_n$—, —[C($R^8$)($R^9$)]$_m$—S(O)$_2$—[C($R^{10}$)($R^{11}$)]$_n$—, a divalent heterocycle, —[C($R^8$)($R^9$)]$_m$-arylene-[C($R^{10}$)($R^{11}$)]$_n$—, where m and n are each independently from 0 to 10,
   wherein $R^8$, $R^9$, $R^{10}$, and $R^{11}$ each independently have the same meaning as the groups $R^1$ to $R^5$, or $R^8$ and $R^9$ together form a lactone group; and
   an amine which is selected from the group consisting of aliphatic, alicyclic, aromatic, araliphatic amines, and a combination thereof, and which has on average per molecule at least two reactive hydrogen atoms bonded to a nitrogen atom;
   wherein the benzoxazine amine adduct is present in the hardener component in a proportion of from 8.5 wt. % to 75 wt. %, and
   wherein the hardener component, when present with an epoxy resin component comprising at least one hardenable epoxy resin, is capable of curing at a temperature of at most 40° C.

2. The hardener component according to claim 1, wherein $R^3$ and $R^5$ each represent H.

3. The hardener component according to claim 1, wherein the benzoxazine amine adduct is obtained by the process comprising:
   reacting a benzoxazine with an amine, which is at least one amine selected from the group consisting of an aliphatic amine, an araliphatic amine, a diamine, a polyamine, and a combination thereof, wherein the benzoxazine is at least one selected from following structures:

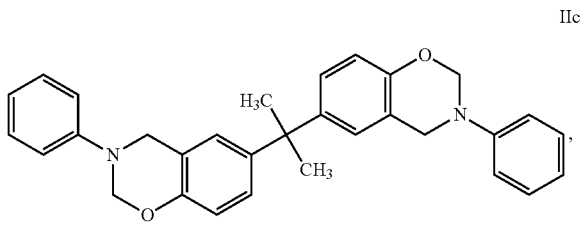

IIc

-continued

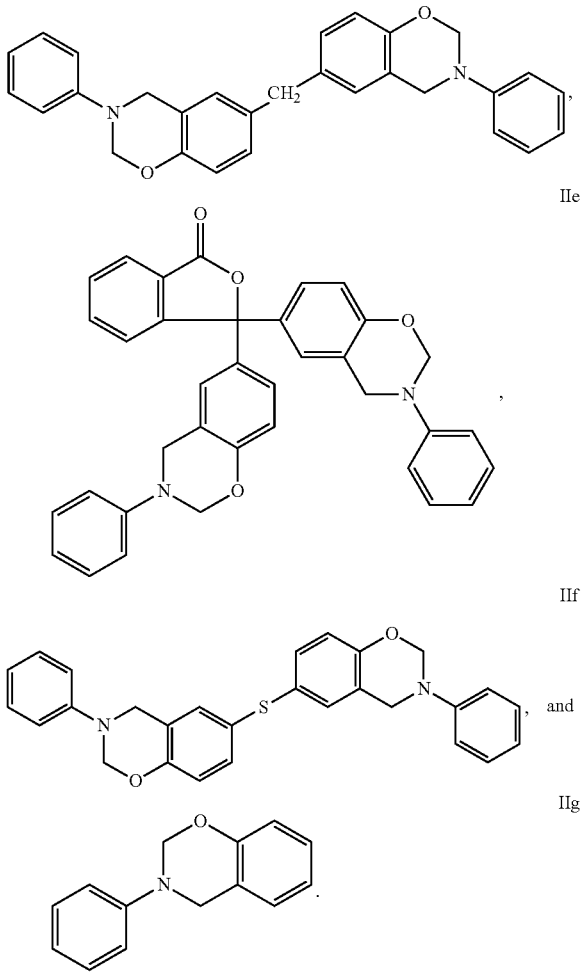

4. The hardener component according to claim 3, wherein the amine reacted with the benzoxazine and the amine present in the hardener component are each selected from the group consisting of 2,2,4- or 2,4,4-trimethyl-1,6-diaminohexane and mixtures thereof, 1-amino-3-aminomethyl-3,5,5-trimethylcyclohexane (IPDA), 1,3-bis(aminomethyl)-cyclohexane (1,3-BAC), 1,4-bis(aminomethyl)-cyclohexane (1,4-BAC), 2-methyl-1,5-pentanediamine (DYTEK A), (3(4),8(9)bis(aminomethyl)dicyclo[5.2.1.02,6] decane and isomer mixtures thereof (TCD-diamine), aminomethyltricyclo[5.2.1.02.6]decane and isomer mixtures thereof (TCD amine), 1,6-hexamethylene diamine, diethylene triamine (DETA), triethylene tetramine (TETA), tetraethylene pentamine (TEPA), pentaethylene hexamine (PEHA), 1,3-benzenedimethanamine (mXDA), 1,4-benzenedimethanamine (pXDA), N,N'-dimethyl-1,3-benzenedimethanamine, and mixtures of two or more thereof.

5. The hardener component according to claim 3, wherein the amine reacted with the benzoxazine and the amine present in the hardener component are each selected from the group consisting of 1-amino-3-aminomethyl-3,5,5-trimethylcyclohexane (IPDA), 2-methyl-1,5-pentanediamine (DYTEK A), m-xylylenediamine (mXDA), 1,3-bis(aminomethyl)-cyclohexane (1,3-BAC), and mixtures thereof.

6. The hardener component according to claim 1, wherein the benzoxazine amine adduct is present in the hardener component in a proportion of from 9 wt. % to 65 wt. %.

7. The hardener component according to claim 6, wherein the benzoxazine amine adduct is present in the hardener component in a proportion of from 10 wt. % to 35 wt. %.

8. The hardener component according to claim 1, wherein the hardener component further comprises:
at least one additive selected from the group consisting of accelerators, adhesion promoters, thickeners, and fillers.

9. A multi-component epoxy resin material, comprising:
an epoxy resin component comprising at least one hardenable epoxy resin, and
the hardener component according to claim 1.

10. The multi-component epoxy resin material according to claim 9, wherein the multi-component epoxy resin material further comprises:
at least one additive selected from the group consisting of accelerators, adhesion promoters, reactive diluents, thickeners, inorganic fillers, and organic fillers.

11. The multi-component epoxy resin material according to claim 9, wherein the multi-component epoxy resin material cures at a temperature of at most 40° C.

12. The multi-component epoxy resin material according to claim 9, wherein the multi-component epoxy resin material cures at an ambient temperature of 21° C. within 48 hours or less.

13. A method for chemical fastening, comprising:
applying the multi-component epoxy resin material according to claim 9 to a fastening element in a borehole.

14. The method according to claim 13, wherein application of the multi-component epoxy resin material anchors the fastening element in the borehole.

15. A method of accelerating curing of an epoxy resin material, comprising:
producing an epoxy resin material comprising the hardener component according to claim 1, comprising the benzoxazine amine adduct as an accelerator.

16. The method according to claim 15, further comprising applying the epoxy resin material to construction elements to chemically fasten the construction elements.

17. The hardener component according to claim 1, wherein m and n are each independently from 0 to 5.

18. The hardener component according to claim 1, wherein Z is selected from the group consisting of a direct bond, —C(R$^8$)(R$^9$)—, —C(R$^8$)(aryl)-, —C(O)—, —S—, —O—, —S(O)—, —S(O)$_2$—, a divalent heterocycle, —[C(R$^8$)(R$^9$)]$_m$-arylene-[C(R$^{10}$)R$^{11}$)]$_n$—, where m and n are each independently from 0 to 5.

19. The hardener component according to claim 1, wherein R$^3$ and R$^5$ each represent H, and wherein Z is selected from the group consisting of a direct bond and —C(R$^8$)(R$^9$)—, where R$^8$ and R$^9$ are:
(a) each independently selected from the group consisting of H, C$_1$-C$_4$ alkyl groups, and a combination thereof, or
(b) together form a lactone group.

20. The hardener component according to claim 19, where R$^8$ and R$^9$ are both selected from the group consisting of H and a methyl group.

* * * * *